United States Patent [19]
Rohrberg et al.

[11] 3,823,298
[45] July 9, 1974

[54] CASSETTE-TYPE TUBE WELDER

[75] Inventors: Roderick G. Rohrberg; Dale R. Brubaker, both of Torrance, Calif.

[73] Assignee: The United States of America as represented by the Secretary of the Air Force, Washington, D.C.

[22] Filed: June 8, 1973

[21] Appl. No.: 368,390

[52] U.S. Cl................. 219/60 A, 219/158, 219/161
[51] Int. Cl.............................................. B23k 9/02
[58] Field of Search.......... 219/59, 60 A, 60 R, 130, 219/158, 159, 161

[56] References Cited
UNITED STATES PATENTS

| | | | |
|---|---|---|---|
| 3,395,262 | 7/1968 | Kazlauskas | 219/60 A |
| 3,400,237 | 9/1968 | Kazlauskas | 219/60 A |
| 3,461,265 | 8/1969 | Spiro | 219/60 A |
| 3,534,199 | 10/1970 | Downey et al. | 219/60 A |
| 3,688,072 | 8/1972 | Witt | 219/60 A |
| 3,708,647 | 1/1973 | Acker | 219/60 A |

Primary Examiner—C. L. Albritton
Attorney, Agent, or Firm—Harry A. Herbert, Jr.; Jacob N. Erlich

[57] ABSTRACT

A cassette-type tube welder for the rapid in-place welding of tubes. This welder includes an electric welding means, a tube gripping means and a power pack having a drive motor and controls. The welding means is in the form of a welding cassette which contains a rotatable tube encircling means that houses the welding electrode. A hydraulically operated piston supplies the motive force to a gripping means secured to the welding cassette in order to butt the tubes to be welded during the welding operation. This tube welder may further be made in a variety of sizes and may accommodate a variety of cassettes.

10 Claims, 7 Drawing Figures

PATENTED JUL 9 1974 3,823,298

CASSETTE-TYPE TUBE WELDER

BACKGROUND OF THE INVENTION

This invention relates generally to welders, and more particularly, to a nonconsumable electrode inert gas welder which utilizes a cassette-type welding head to accommodate various sized tubes to be welded.

Inert gas welders such as described in U.S. Pat. Nos. 3,534,199 and 3,688,071 are widely used for in-place welding of tubing and the like. These welders are particularly useful for in-place welding of tubing in aircraft assemblies operations, since they require very little working space around the joint to be welded.

The prior art welders as described above generally include a nonconsumable tungsten electrode which is carried by a sectored carrier ring. The tubes that are to be welded are clamped in place, and the carrier ring is rotated to move the electrode about a path adjacent the tubes to be welded. The welding is performed in a chamber in which inert gas is supplied before, during and after the welding. Control equipment is provided to regulate the speed of the motor which drives the carrier ring, the supply of inert gas to the welding chamber and power supplied to the electrode.

One of the problems encountered with the use of welders of the type set forth hereinabove is that due to the limited space involved, particularly in aircraft assembly operations or repair operations, it would be desirable to further minimize the size of the welder. Heretofore, arrangements have not been successfully provided which contain either a plurality of welding heads or in some cases even a plurality of complete welders so that the above mentioned welding operations can be performed in a minimum of space. These arrangements have either proved to be extremely expensive to manufacture or in some cases unreliable in operation.

SUMMARY OF THE INVENTION

The instant invention sets forth a cassette-type tube welder which overcomes the problems encountered in the past and as set forth hereinabove.

The welding tool of this invention is made up of three basic components; namely, the vise section, the welding cassette, and the power pack.

Functionally, the vise section of this invention which contains a pair of vise units provides the gripping capability, transmits the squeeze or forging force and provides for the mounting and positioning of the cassette. The gripping action is obtained through a segmented collet actuated by a mechanical linkage which allows for individual gripping on either end of the tube inserted therein. The forging force is developed by hydraulic pressure acting through a diaphragm/pressure plate combination. The cassette housing is attached to one of a pair of vise units and incorporates therein a electric power contact and drive wheel for rotation of the welding electrode. The cassette housing and one of the vise units form a common unit that moves with respect to the other vise unit. The pressure plate is located adjacent the cassette housing vise unit combination and provides the forging load by hydraulic pressure acting through a bladder to move a piston against the backing plate of the cassette gripping combination.

The power pack component of this invention incorporates therein conventional elements such as the drive motor, control switches and terminations for the welding power, shielding gas and hydraulic line. This power pack is fixedly secured adjacent the pressure plate of the vise section.

The welding cassette of this instant invention provides a unique concept for packing the welding components in a readily removal, completely self-contained, plug-in module. The cassette may be manufactured containing various sized welding heads with the basic elements contained therein being identical in construction or the entire welding cassette may be of any size to fit within various sized welding tools so as to accommodate many tube sizes. These cassettes are mounted for operation within the cassette housing of the vise section of this invention.

It is therefore an object of this invention to provide a cassette-type tube welder which is capable of welding various sized tubing.

It is another object of this invention to provide a cassette-type tube welder which is portable in nature and of a minimal size.

It is a further object of this invention to provide a cassette-type tube welder which is capable of utilizing a plurality of welding cassettes or which may be manufactured in various sizes.

It is still a further object of this invention to provide a cassette-type tube welder which is economical to produce and which utilizes conventional, currently available components that lend themselves to standard mass producing manufacturing techniques.

For a better understanding of the present invention together with other and further objects thereof reference is made to the following description taken in conjunction with the accompanying drawing and its scope will be pointed out in the appended claims.

DETAILED DESCRIPTION OF THE PREFERRED EMBODIMENT

Figure 1:
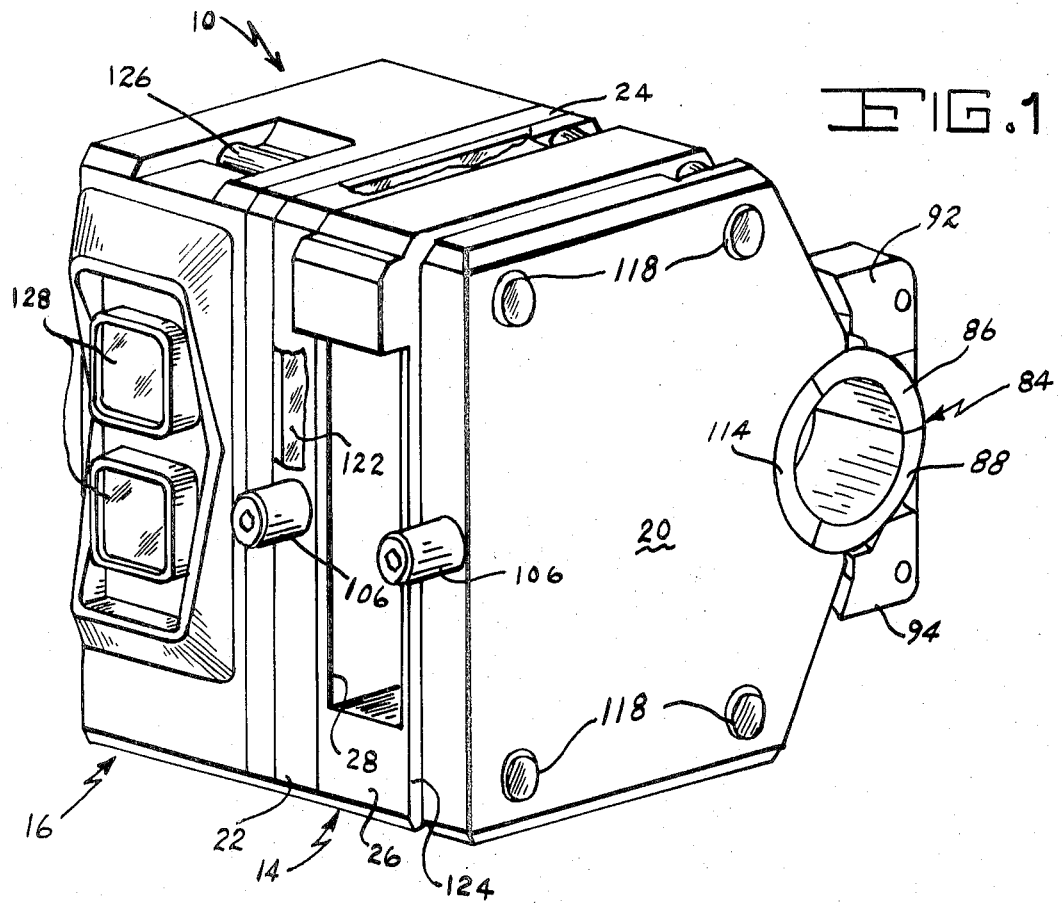
FIG. 1 is a pictorial view of the front face of the cassette-type tube welder of this invention with the welding cassette removed.
Figure 2:
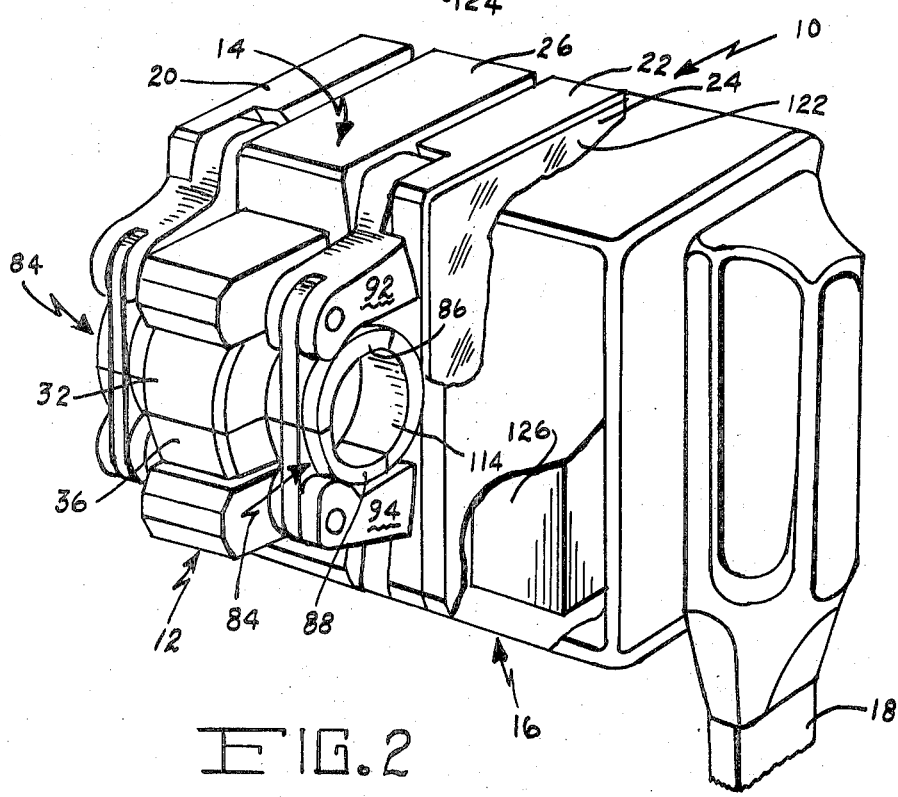
FIG. 2 is a pictorial view of the rear face of the cassette-type tube welder of this invention with the welding cassette in place.

Reference is now made to FIGS. 1 and 2 of the drawing which best show the Cassette-Type Tube Welder 10 of this invention. Tube welder 10 may be made of any size or it may be made of a standard size capable of accommodating any of a plurality of cassette welders 12 as shown in place in FIG. 2 of the drawing and which will be explained in detail hereinbelow. Making up tube welder 10 of the instant invention are three basic components (1) the vise section 14, (2) the power pack 16 and (3) the cassette welder 12. The foregoing elements are assembled as an integral unit and are connected to a suitable programmer (not shown) by any conventional line 18 which provides regulated electrical power, shielding gas and a fluid pressure source.

Vise section 14 is composed of a pair of vise units 20 and 22, a pressure plate 24 integrally connected to one side of vise unit 22 and a cassette housing 26 made of any suitable material such as phenolic to provide electrical insulation integrally connected to the other side of vise unit 22 to form a common unit therewith which moves with respect to unit 20. The complete description of vise units 20 and 22 will be set forth in detail hereinbelow.

The welding means of this invention is contained in a removable cassette 12 (best shown in FIG. 3) which inserts into a slot 28 (shown in FIG. 1) within cassette housing 26, being retained therein by any suitable detent arrangement (not shown). The internal configuration of the welding cassette 12 are best shown in FIGS. 4 and 5 with a modified cassette welder 12' shown in FIG. 6.

Figure 3:
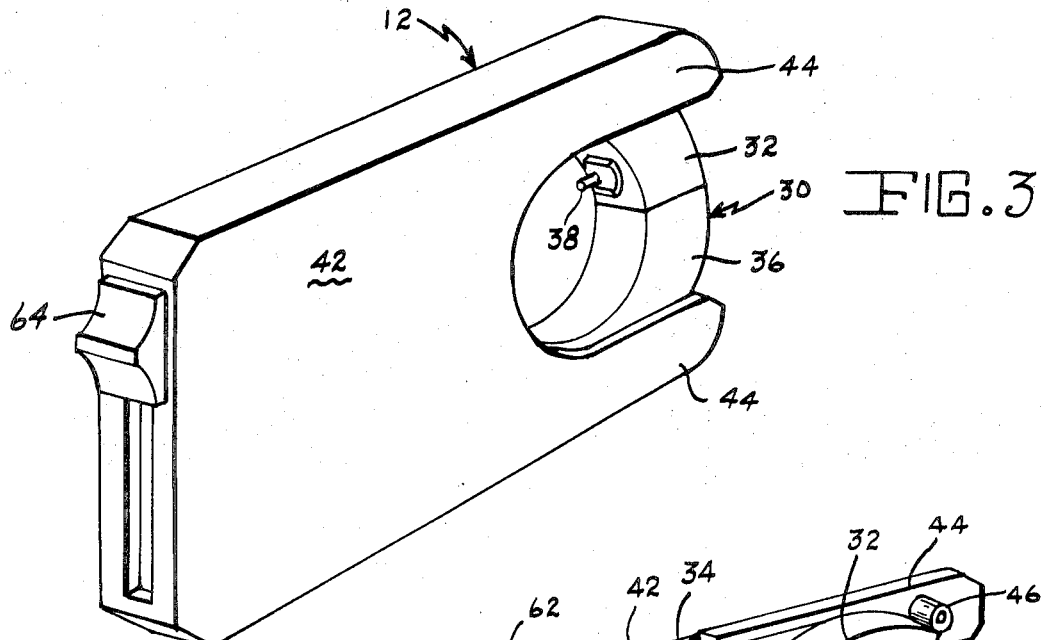
FIG. 3 is a pictorial view of the welding cassette utilized in the cassette-type tube welder of this invention and shown in the operative or closed position.
Figure 4:
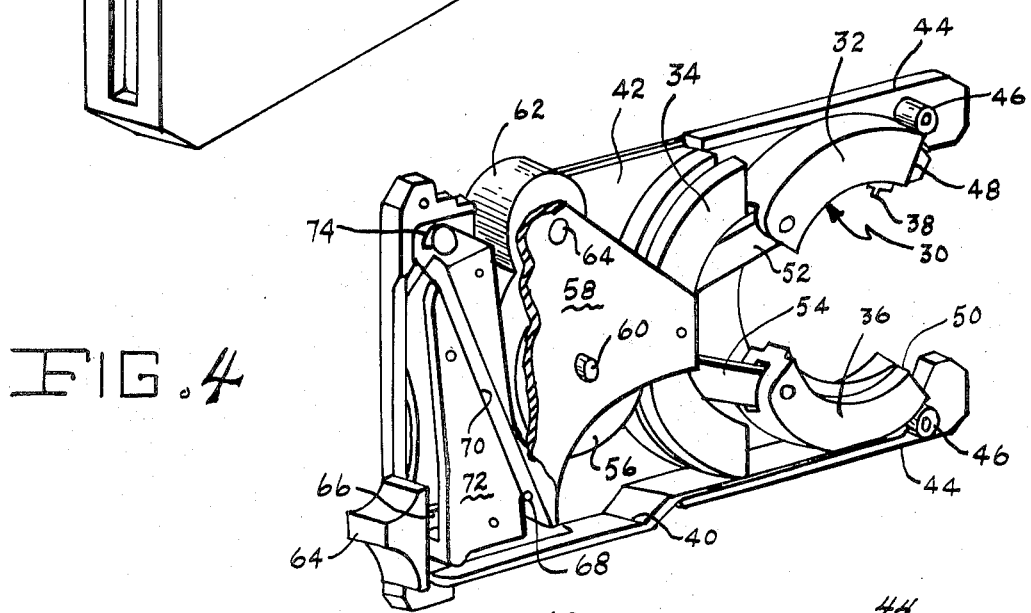
FIG. 4 is a cut-away pictorial view of the welding cassette utilized in the cassette-type tube welder of this invention and shown in the inoperative or open position.
Figure 5:
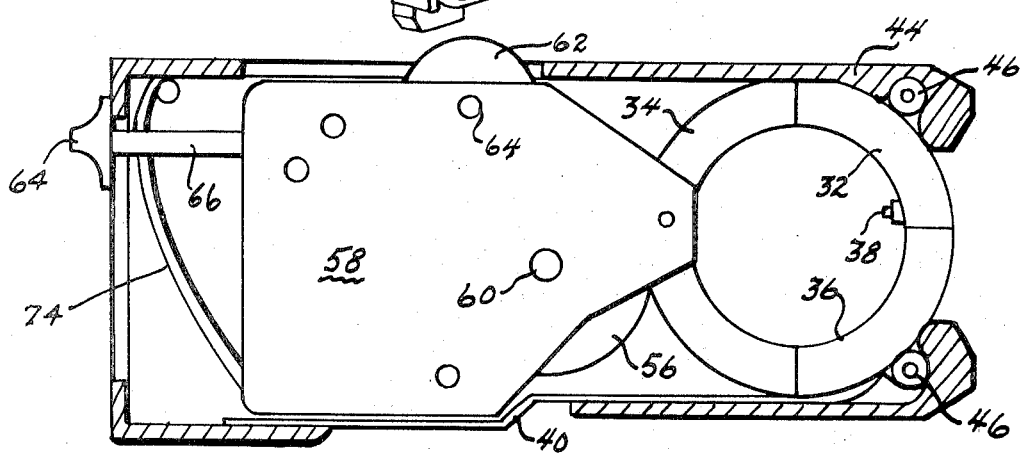
FIG. 5 is a cross sectional side elevational view of the welding cassette utilized in the cassette-type tube welder of this invention and shown in the operative or closed position.

Referring to FIGS. 3 through 5, a three piece rotatable welding head 30 is made up of sections 32, 34 and 36. These sections are arranged in such a manner as to encircle the abutting tube ends to be welded when shown in the closed or operative position as in FIGS. 3 and 5. Rotatable head or element 30 further carries any suitable TIG electrode 38 in the inner circumference thereof. Welding current from power pack 16 is supplied through a leaf spring contact 40 which engages a conductive area on the outer surface of rotatable element 30. Element 30 is contained between a pair of cassette side plates 42 and is housed in extending portions 44 thereof in contact with any suitable bearing means such as idler rollers 46 to allow rotation thereof. Sections 32 and 36 include interfitting end faces 48 and 50 for engagement with one another and are further connected through links 52 and 54 to section 34. A roller 56 is rotatably mounted within housing or subframe 58 and is in frictional engagement with the outer periphery of rotatable element 30 being journaled at 60 to subframe 58. Roller 56 is in turn driven in rotation by roller 62 mounted on shaft 64 within subframe 58 when the lever 64 is in the raised position as shown in FIG. 5 and roller 64 engages a drive means (not shown).

Lever 64 is slideably mounted by rod 66 and pin 68 within a slot 70 within a cam arrangement 72 fixedly secured within subframe 58. Any suitable biasing means such as spring 74 causes the movement of subframe 58 into the position shown in FIG. 5 when lever 64 is moved to the raised position. In this position roller 56 bears against section 34 and exerts pressure through inclined links 52 and 54 to push sections 32 and 36 outwardly. Contact by idler rollers 46 with arcuate outer surfaces of sections 32 and 36 result in moving ends 48 and 50 together (as shown in FIGS. 4 and 5) encircling the tubing to be welded.

Figure 6:
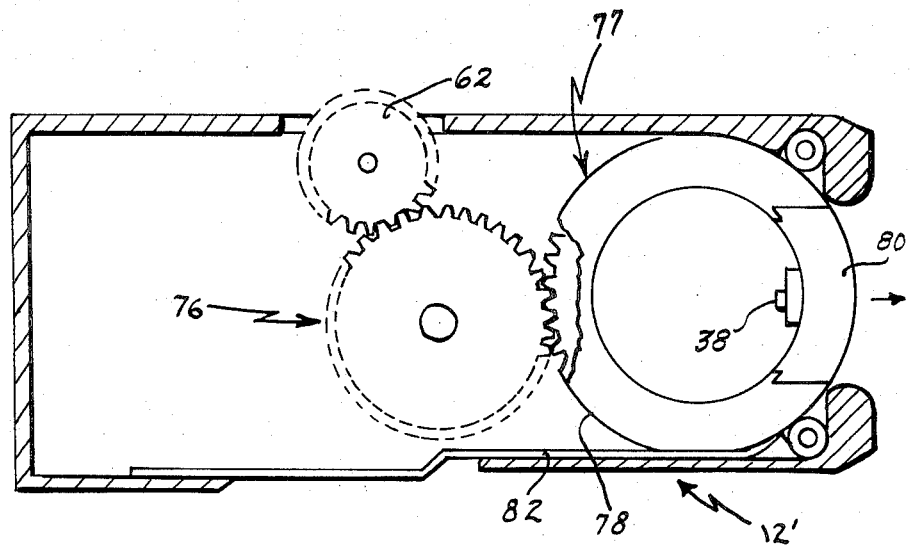
FIG. 6 is a cross sectional side elevational view of a modified welding cassette utilized in the cassette-type tube welder of this invention and shown in the operative position or closed position.

A modified welding cassette 12' is shown in FIG. 6 in which the friction drive concept of cassette 12 was converted to a gear train 76 and a rotatable element 77 made up of a fixed C section rotor 78 having a removable electrode section 80 slideably mounted therein. A leaf spring contact 82 identical in nature to spring 40 engages a conductive area on the outer surface of rotatable element 77.

Either welding cassette 12 or 12' may be inserted within cassette slot 28. The size of welding cassette 12 or 12' may vary in accordance with the size of slot 28 or in some cases the cassette size may remain fixed while the internal diameter of welding head 30 may vary. In addition, the size of the welding tool 10 may be varied all within the scope of this invention, thereby accommodating numerous sized tubes to be welded.

Figure 7:
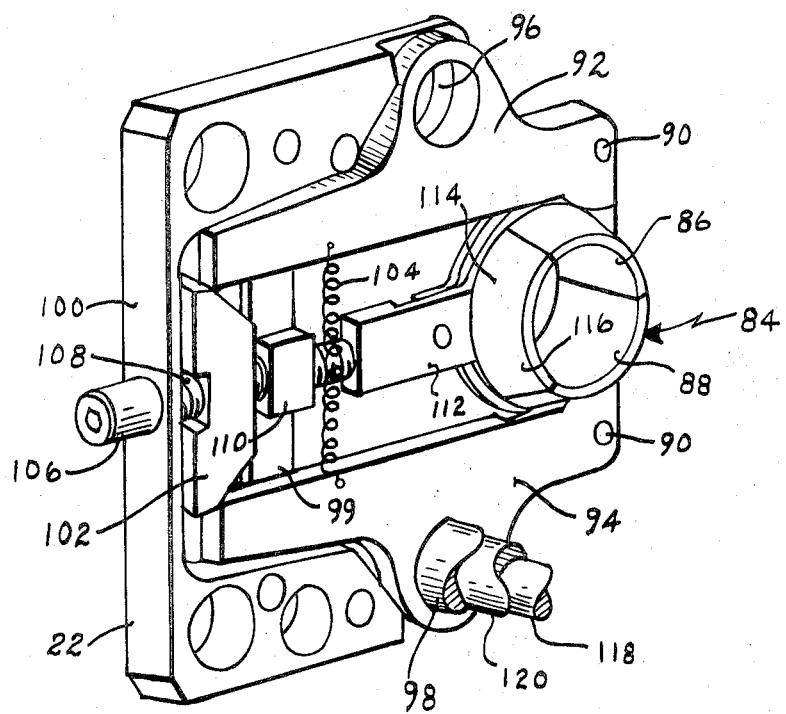
FIG. 7 is a pictorial view of one of a pair of vise units utilized in the cassette-type tube welder of this invention.

Reference is now made to FIGS. 1, 2 and 7 of the drawing which best show the vise section 14 of the instant invention. Vise section 14 is made up of a pair of vise units 20 and 22 which are of similar construction (shown as an individual element in FIG. 7), a pressure plate 24 and cassette housing 26. Vise units 20 and 22 serve a dual function, initially, these units secure the weld tool 10 in position and align the tube ends (not shown) to be welded through engagement of the abutting tube sections by a three piece gripping mechanism or jaw members 84. Secondly, vise units 20 and 22 by means of pressure plate 24 also provide for the application of axial loads for upsetting the tube ends during the weld cycle in a manner to be described hereinbelow.

As shown in FIG. 2 of the drawing vise units 20 and 22 are identical in construction, with only vise unit 22 shown in FIG. 7. All numerals set forth with respect to unit 22 will be used for unit 20 where applicable. Referring to FIG. 7, vise unit 22 comprises a gripping mechanism 84 made up of upper and lower jaw segments 86 and 88, pivotally mounted at 90 on the outer ends of lever members 92 and 94, respectively, which are journaled at 96 and 98 to frame 100. Gripping mechanism 84 is opened by the withdrawal of cam 102 from between levers 92 and 94 which are biased thereagainst by spring 104. The withdrawal of cam 102 takes place by the rotation of knob 106 fixedly secured to the end of a threaded shaft 108 threadably secured to cam 102 and journaled in boss 110. Boss 110 is fixedly secured to the rear portion 99 of frame 100. Shaft 108 also connects through extension 112 to an inner jaw segment 114 for translatory movement thereof. The retraction of jaw segment 114 occurs simultaneously with the movement of lever elements 92 and 94 under the action of spring 104. Jaw segments 86 and 88 are free to swing outwardly on levers 92 and 94 when jaw segment 114 is disengaged from contact therewith, thereby opening the gripping mechanism 84 to receive the tubing to be welded. The outer periphery of jaw members 84 further include tapered areas 116 which serve to center and position electrode ring 30 during the welding cycle.

The hereinabove described vise units 20 and 22 are secured in assembled relationship by means of bolts 118 which pass through openings 96 and 98 in frame 100. The cassette housing 26 is secured to vise unit 22 to form a combination therewith and this combination is axially movable on suitable bushings 120 which are provided where required. The outer vise unit 20 and the power pack 16 are secured in fixed relationship with one another. A hydraulic diaphragm made of any suitable material such as neoprene is provided to apply a pressure to move a rectangular piston 122 (as shown in FIGS. 1 and 2 of the drawing) against the backing plate of vise unit 22. This causes the axial displacement of the cassette housing 26 vise unit 22 combination toward the vise unit 20 within the limit defined by space 124 shown in FIG. 1. A 6-square-inch piston 122, activated by a 600 psi hydraulic pressure, would provide a 3,600-pound end load for the forging or upsetting action required during the welding sequence. The amount of upsetting is predetermined by the location of an adjusting screw 126. A small micro-switch (not shown) is actuated when the vise unit 22 has moved the preset travel distance and thus signals the programmer that the upset has been completed.

The power pack 16 of the weld tool 10 of this invention incorporates therein a drive motor 126 as well as control switches and terminations for weld power, shielding gas, and the hydraulic line. These elements are not shown in the drawing since they are conventional in nature. The functions to be controlled at the weld head 30 include gas purge weld initiation, emergency stop and preload actuation. The push button switches 128 are illuminated and labelled as to function and control the operational sequence.

In operation the welder 10 is positioned and secured on the tubing sections (not shown) through engagement with gripping mechanism or jaws 84. The preadjusted welding cassette 12 is then inserted and locked in place. An initial preload is applied hydraulically to vise unit 22 to force the ends of the tubing into a butting contact. The program weld cycle is then initiated through welder 10 which drives electrode 38 in rotation through frictional engagement with roller 62 which is operably connected in any conventional manner to any suitable drive motor 126. Furthermore welding current and shielding gas is supplied through the interior of the cassette 12. Upon completion of the initial phase of the weld cycle hydraulic pressure through bladder 122 is increased to forge or upset the joint area. The inclined surfaces 116 on jaws 84, which contact the inside edges of electrode ring 30 serve to increase the arc gap during the upsetting operation by expanding segmented ring 30.

Although this invention has been described with reference to a particular embodiment it will be understood to those skilled in the art that this invention is also capable of a variety of alternate embodiments within the spirit and scope of the appended claims.

We claim:

1. A cassette-type tube welder comprising a power pack, a first vise unit fixedly secured to said power pack, a second vise unit moveably mounted between said power pack and said first vise unit, a cassette housing fixedly secured to said second vise unit for movement therewith, means interposed between said power pack and said second vise unit for moving said second vise unit and said cassette housing with respect to said first vise unit, a welding cassette removeably mounted within said cassette housing and a welding electrode rotatably mounted on said welding cassette whereby a first and second tube is securely held by each of said vise units respectively in a butting relationship while said welding electrode rotates about said butted portion of said tubes in order to produce weld therebetween.

2. A cassette-type tube welder as defined in claim 1 wherein at least one of said vise units comprise a frame, a gripping mechanism moveably mounted on said frame, said gripping mechanism being made up of a plurality of jaws moveably mounted with respect to one another and means for simultaneously moving said jaws.

3. A cassette-type tube welder as defined in claim 1 wherein said welding cassette further comprises means of rotatably mounting said electrode therein and means for rotating said electrode mounting means.

4. A cassette-type tube welder as defined in claim 1 wherein said means for moving said second vise unit is in the form of a piston operably connected to said second vise unit.

5. A cassette-type tube welder as defined in claim 4 wherein said welding cassette further comprises means of rotatably mounting said electrode therein and means for rotating said electrode mounting means.

6. A cassette-type tube welder as defined in claim 5 wherein said electrode mounting means comprises a segmented ring, said segmented ring being made up of a plurality of interconnected sections capable of movement with respect to one another for encircling the tubes to be welded, means connected to one of said sections for opening and closing said segmented ring to allow insertion of the tubes to be welded therebetween and means for electrically connecting said electrode to an electrical source.

7. A cassette-type tube welder as defined in claim 6 wherein at least one of said vise units comprise a frame, a gripping mechanism moveably mounted on said frame, said gripping mechanism being made up of a plurality of jaws moveably mounted with respect to one another and means for simultaneously moving said jaws.

8. A cassette-type tube welder as defined in claim 7 wherein said means for simultaneously moving said jaws comprise a pair of levers pivotally secured to said frame, a first and second jaw connected to each of said levers respectively, a cam interposed between said levers, a third jaw operably connected to said cam, and means interconnecting said cam to said third jaw for moving said cam and said third jaw and thereby causing said plurality of jaws to move to the open or closed position.

9. A cassette-type tube welder as defined in claim 5 wherein said electrode mounting means comprises a C-shaped ring and a removable element connected therewith for mounting said electrode, and means for electrically connecting said electrode to an electrical source.

10. A cassette-type tube welder as defined in claim 9 wherein at least one of said vise units comprise a frame, a gripping mechanism moveably mounted on said frame, said gripping mechanism being made up of a plurality of jaws moveably mounted with respect to one another and means for simultaneously moving said jaws.

* * * * *